Sheet 1 - 2 Sheets

J. L. Kintner.
Hay Loader.

Nº 64111. Patented Apr. 23, 1867.

Witnesses
C. L. Standiff
G. F. Downs

Inventor
Jacob L. Kintner

J. L. Kintner.
Hay Loader.
Nº 64111      Patented Apr. 23, 1867.
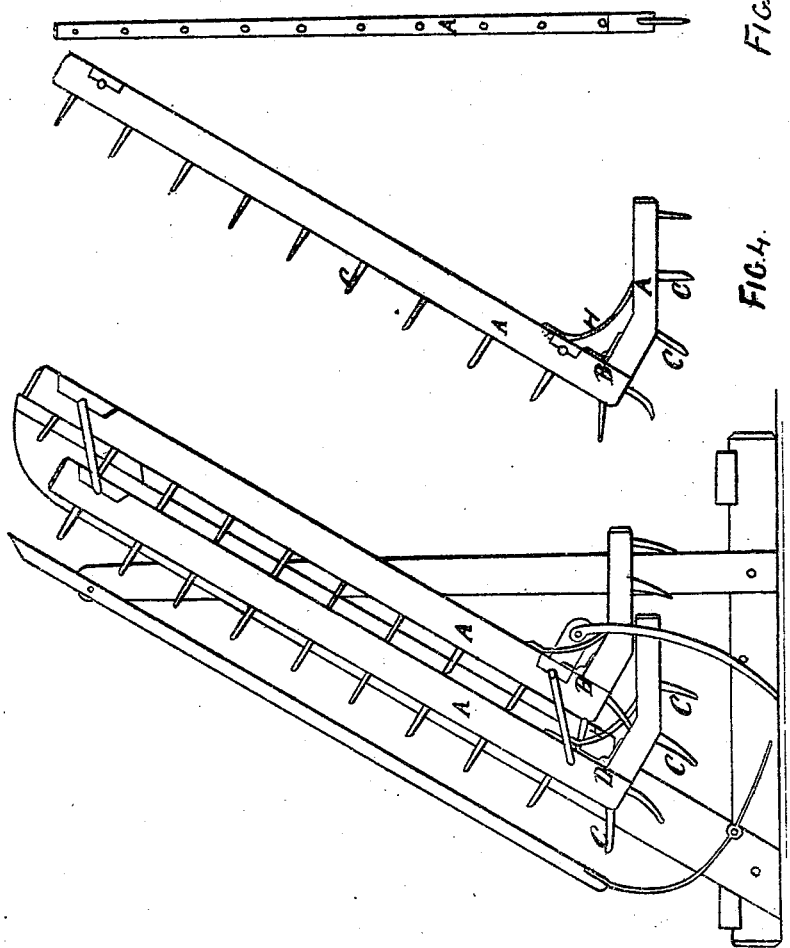
Witnesses                Inventor.
C. L. Standiff
G. F. Downs              Jacob L. Kintner

United States Patent Office.

JACOB L. KINTNER, OF HARRISON COUNTY, INDIANA.

Letters Patent No. 64,111, dated April 23, 1867.

IMPROVEMENT IN HAY-ELEVATORS.

The Schedule referred to in these Letters Patent and making part of the same.

Be it known that I, JACOB L. KINTNER, of the county of Harrison, State of Indiana, have invented a new and useful Machine for Elevating Hay, Straw, and Similar Substances; and do hereby declare that the following is a clear, full, and exact description of the construction and operation of the same, reference being had to the annexed drawings, making a part of this specification, in which—

Figure 1:
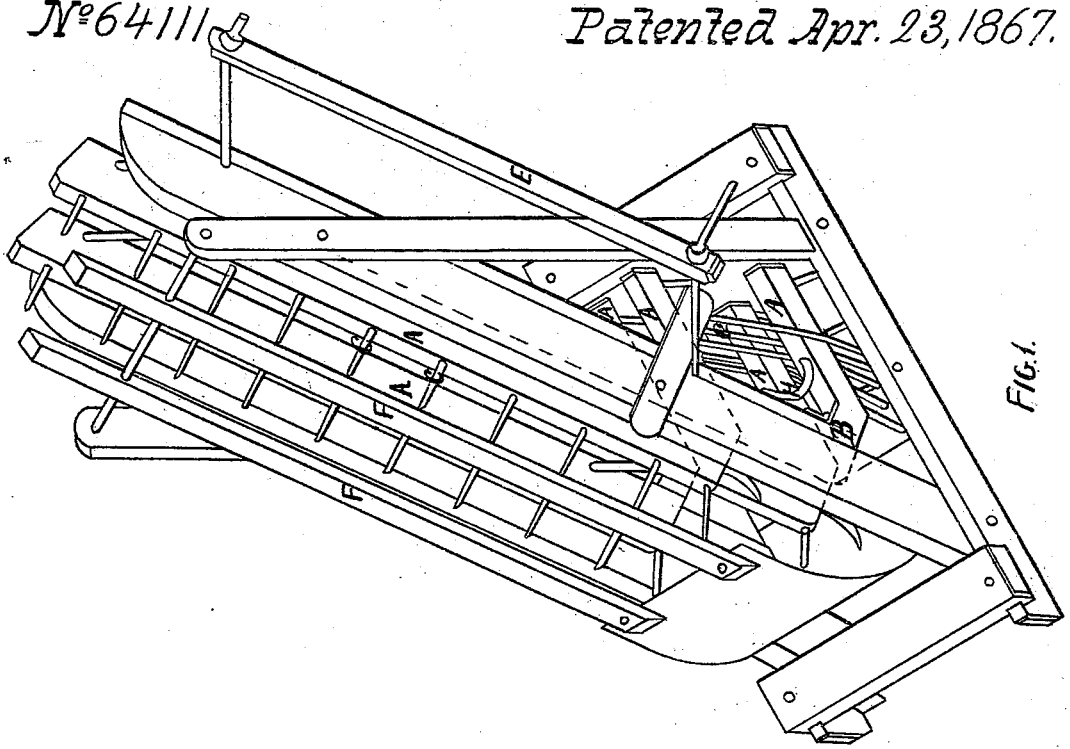
Figure 3:
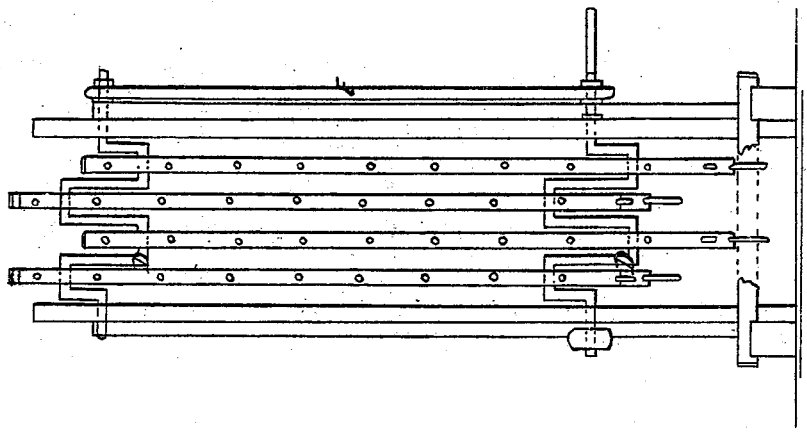
Figure 6:
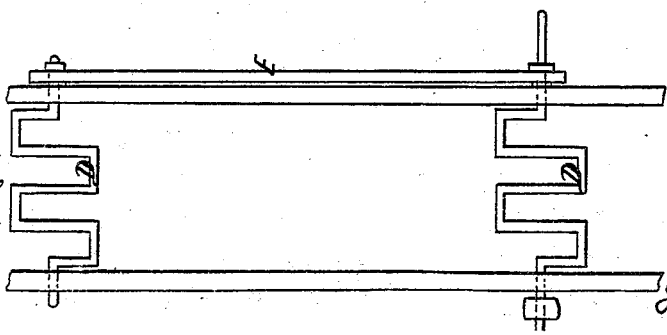

Figure 1 is a perspective elevation.
Figure 2 is a longitudinal section.
Figure 3 is a front view with guide strips removed.
Figure 4 is a side view of lifting and feed-bars.
Figure 5 is a front view of same.
Figure 6 is a view of cranks, pitman, and pulley in frame.

This invention, which it is designed to use both stationary and (by a proper modification) when in motion, consists in the employment of two or more inclined bars, A A, of any desired shape, either straight or crooked, with or without a hinge-joint, B, filled with a sufficient number of teeth or pins, C C, or their equivalents, and operated by means of cranks or other reciprocating motion, in such a manner that while one is at the highest point with the load, the other is loading and ready to ascend. I employ a set of cranks, D D, at top and bottom, alternating the toothed lifting-bars A A, and connecting the cranks by means of a pitman, E, to insure a regular motion. I also cover the bars with the guide-strips F F, to keep the hay or other substance in place. When constructing the machine for field use I make the toothed bars A A bent, with a hinge or joint, B, and spring, H, to allow it to pass over obstructions, mounting the whole upon wheels, and communicating motion from these wheels to the cranks D D, and attach a rake, G, which collects the hay, which is then caught by the teeth C C and carried forward and upward. I also continue the guides F F around the angle or curve, as shown by the drawings.

What I claim is—

The guide-bars F F, having their lower ends connected to a curved plate, in combination with the rake G and bars H H, all constructed and operating in the manner and for the purpose set forth.

JACOB L. KINTNER.

Witnesses:
   G. F. DOWNS,
   JOS. CLEMENT.